(12) United States Patent
Pahle

(10) Patent No.: US 8,833,530 B2
(45) Date of Patent: Sep. 16, 2014

(54) BRAKE DRUM IMPLEMENTED AS A CASTING AND METHOD OF MAKING SAME

(75) Inventor: Wolfgang Pahle, Bad Wiessee (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 152 days.

(21) Appl. No.: 13/344,336

(22) Filed: Jan. 5, 2012

(65) Prior Publication Data

US 2012/0118684 A1 May 17, 2012

Related U.S. Application Data

(63) Continuation of application No. PCT/EP2010/059559, filed on Jul. 5, 2010.

(30) Foreign Application Priority Data

Jul. 6, 2009 (DE) .......................... 10 2009 032 008

(51) Int. Cl.
F16D 65/10 (2006.01)
F16D 65/02 (2006.01)

(52) U.S. Cl.
CPC ........ F16D 65/10 (2013.01); F16D 2065/1392 (2013.01); F16D 2200/0013 (2013.01); F16D 2065/136 (2013.01)
USPC .................................... 188/218 R

(58) Field of Classification Search
CPC ..... F16D 65/10; F16D 69/04; F16D 69/0146; F16D 2250/0015; F16D 2065/136; F16D 2065/1392
USPC ..................................... 188/218 R
See application file for complete search history.

(56) References Cited

U.S. PATENT DOCUMENTS

| 1,975,968 | A | | 10/1934 | Nelson | |
|---|---|---|---|---|---|
| 2,026,263 | A | | 12/1935 | White | |
| 2,558,297 | A | * | 6/1951 | Horn | 188/218 R |
| 2,588,665 | A | | 3/1952 | Sinclair | |
| 2,679,304 | A | * | 5/1954 | Horn | 188/218 R |
| 6,230,848 | B1 | | 5/2001 | Niebling et al. | |
| 2004/0064925 | A1 | * | 4/2004 | Muller et al. | 24/545 |
| 2012/0175202 | A1 | * | 7/2012 | Pahle et al. | 188/218 XL |

FOREIGN PATENT DOCUMENTS

| CH | 369669 | 5/1963 |
|---|---|---|
| CN | 2695718 Y | 4/2005 |
| CN | 2828433 Y | 10/2006 |
| CN | 101346556 A | 1/2009 |
| DE | 29 27 148 A1 | 2/1981 |
| DE | 197 23 578 A1 | 12/1998 |
| EP | 0 490 021 B1 | 11/1994 |
| WO | WO 2007/076156 A2 | 7/2007 |

OTHER PUBLICATIONS

Chinese-language Office Action dated Jul. 24, 2013 (seven (7) pages).

(Continued)

Primary Examiner — Thomas J Williams
(74) Attorney, Agent, or Firm — Crowell & Moring LLP

(57) ABSTRACT

A brake drum implemented as a casting includes a cylindrical drum body and a connected flange for mounting to a wheel hub. The drum body and the flange are materially separated from each other and are inter-connected in a radially displaceable manner by use of cast-in sliding elements.

15 Claims, 7 Drawing Sheets

(56) References Cited

OTHER PUBLICATIONS

International Preliminary Report on Patentability Jan. 10, 2012 (six (6) pages).

International Search Report dated Oct. 19, 2010 including English-language translation (Six (6) pages).

* cited by examiner

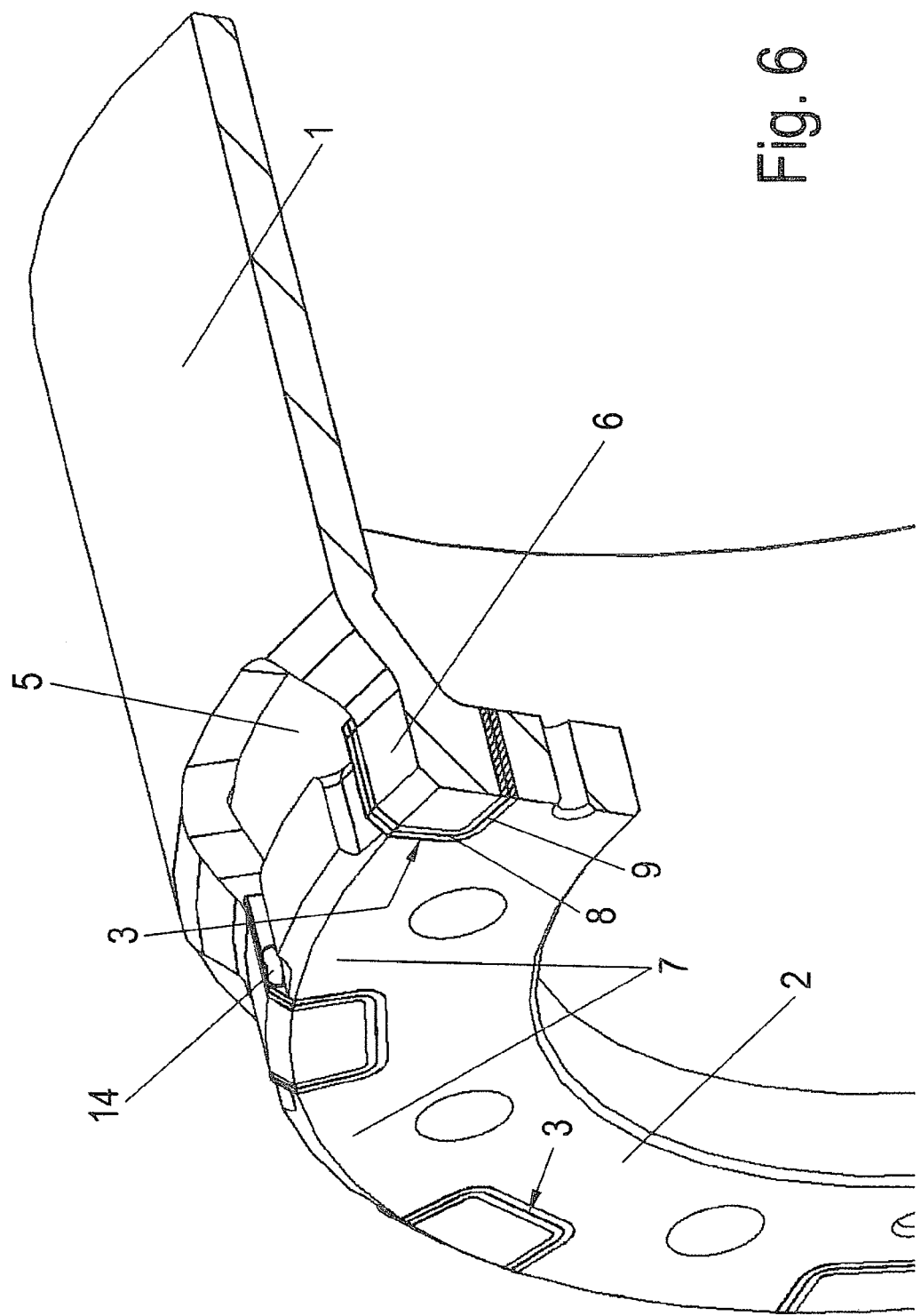

BRAKE DRUM IMPLEMENTED AS A CASTING AND METHOD OF MAKING SAME

CROSS-REFERENCE TO RELATED APPLICATIONS

This application is a continuation of PCT International Application No. PCT/EP2010/059559, filed Jul. 5, 2010, which claims priority under 35 U.S.C. §119 from German Patent Application No. DE 10 2009 032 008.3, filed Jul. 6, 2009, the entire disclosures of which are herein expressly incorporated by reference.

This application contains subject matter related to U.S. application Ser. No. 13/344,346, entitled "Brake Disc Implemented as a Casting and Method of Making Same" filed on even date herewith.

BACKGROUND AND SUMMARY OF THE INVENTION

The invention relates to a brake drum implemented as a casting.

Brake drums of this type are commonly formed in one-piece from gray cast iron, i.e. the cylindrical drum casing and the radially inwardly extending flange connected at one end are rigidly connected to one another.

During braking, the drum casing expands radially on account of heating by brake shoes bearing frictionally against the inner wall of the drum. In the region in which the drum casing is rigidly connected to the flange, however, this expansion is prevented by the flange, and therefore the drum casing expands conically toward the open end. In this process, the inner wall of the drum casing, i.e. the friction surface, loses its cylindrical configuration, as a result of which the braking action is reduced to an unacceptable extent.

In addition, the expansion which is prevented by the flange in the connection region leads to stresses in the friction surface of the drum casing, with consequent heat cracks, which may even lead to bursting of the drum casing.

The deformation of the drum casing, which is also referred to as bending, also gives rise to a non-uniform contact pattern and non-uniform wearing of the engaging brake shoes and of the drum casing.

If the brake shoes are changed, it is therefore necessary to machine the drum casing, during which a cylindrical friction surface is created again by turning out.

In order to eliminate these indeed very serious disadvantages, it is proposed in EP 0 490 021 B1, for example, to stiffen the drum casing by concomitantly casting in circumferential steel rings. These steel rings are prefabricated in the form of a cage. However, this concept acting in the sense of a brace has not been proved to be suitable to the desired extent.

Other design solutions for stabilizing the drum casing, i.e. for avoiding the bending, provide for the drum casing to be stiffened, for which purpose a circumferential rib is integrally formed on the outer side thereof at least in the free end region. However, this measure leads firstly to an increase in the mass of the brake drum as a whole and secondly, by suppression of the thermal expansion, to additional thermal stresses in the drum casing, which incidentally similarly applies for the above-mentioned embedding of steel rings.

A brake drum of a different generic type is known from DE 29 27 148 A1, this brake drum not being implemented as a casting but instead consisting of steel. In this document, substantially obstruction-free radial expansion of the drum casing is achieved in that the latter is connected to the flange such that it can move freely in the radial direction.

However, the fastening of the flange to the drum casing is very complicated and is an obstacle to optimized production in terms of its manufacturing costs. Irrespective of this, a steel brake drum of this type has operational and functional disadvantages compared to a cast brake drum, and therefore this brake drum is not a recommendable alternative.

The invention is based on the object of further developing a brake drum of the above-described type such that its service life is increased and its operational reliability is improved with little design and manufacturing outlay.

This and other objects are achieved by a brake drum implemented by a casting, having a cylindrical drum casing and a connected flange, for fastening to a wheel hub. The drum casing and the flange are materially separated from one another and are connected to one another such that they can move radially in relation to one another by cast-in sliding elements.

The material separation of the flange and of the drum casing by means of the sliding elements has the effect that unobstructed, thermally induced radial expansion of the drum casing is possible even in the case of a cast brake drum.

Here, it should be emphasized in particular that it is extraordinarily simple to produce this brake drum.

The sliding elements, which consist of a material with a melting point which is higher than that of the cast material of the drum casing and of the flange, and of metallic material, preferably of stainless steel, or non-metallic material, for example of ceramic, are inserted into the casting mold, and the brake drum is then cast as a one-piece component.

According to a preferred embodiment of the invention, the drum casing and the flange each have a toothed ring, the teeth of which engage with one another. Here, the sliding elements are arranged between the radial side faces and also the contact faces of the teeth which face toward one another.

The cast blank initially completely encloses the sliding elements. During subsequent machining, material is removed from a rim of the flange, which protrudes outward beyond the drum casing, by turning until the sliding elements are exposed and the teeth of the two toothed rings lie in a circumferential plane. Two separate components, which are movable radially with respect to one another, are formed as a result.

Appropriate shaping of the sliding elements provides a positive connection between the flange and the drum casing which acts in the axial direction. For this purpose, radially extending beads are provided in the sliding elements, for example, the beads permit the radial movement of the drum casing with respect to the flange but preclude axial movement.

A further aspect of the invention provides for each sliding element to be formed with two plies, wherein one of the two plies which lie one against the other is held positively on the drum casing and the other ply is held positively on the flange. In this case, too, the configuration is selected such that the drum casing can move radially without obstruction, in which case the faces of the two plies which lie against one another then shift with respect to one another.

If the sliding elements are formed with one ply, it is expedient for there to be a coating on one side, with which a connection between the sliding element and the associated casting is prevented.

Each sliding element can have a U-shaped outline and surround a tooth of the toothed ring of the drum casing on three sides, the web which connects the—in this respect parallel—legs resting on the base of a tooth space of the toothed ring of the flange which has formed.

In order to provide the drum casing with the possibility to expand radially in any case, i.e. even in the event of possible warpage of the sliding elements during casting, the legs of the U-shaped sliding element are arranged at an angle with respect to one another in the radial direction, such that a tapered portion, or inversely a widened portion, is produced in the direction of the axis of rotation of the brake drum.

The arrangement of the sliding elements between the teeth of the toothed rings makes a high load-bearing capacity possible, since it is merely necessary for torque-dependent compressive forces to be absorbed, which of course permits small dimensioning, in particular in terms of the material thickness.

In principle, the problems described in relation to the prior art which arise as a result of thermal loading are solved, this including in particular the considerable reduction in susceptibility to cracking and the prevention of tangential skewed wearing of the brake pads and of the drum casing.

The use of stainless steel as sliding elements prevents corrosion in the region of separation between the drum casing and the flange, as a result of which a very high service life of the brake drum is obtained.

The operational behavior of the brake drum is positively influenced by a further aspect of the invention, according to which cooling openings are created by forming the teeth of the drum casing in the projection region with the teeth of the flange. These cooling openings ensure a very good dissipation of heat in the region of connection between the drum casing and the flange.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 6 shows a partial section of the brake drum, likewise in a diagrammatic illustration.

DETAILED DESCRIPTION OF THE DRAWINGS

FIGS. 1 to 6 show a brake drum which is implemented as a casting and has a drum casing 1 and a flange 2 materially separated therefrom, by which flange 2 the brake drum can be fastened to a wheel hub (not shown) of a vehicle.

The material separation between the drum casing 1 and the flange 2 makes it possible for the components to move in relation to one another in the radial direction, for which purpose provision is made of cast-in sliding elements 3 which consist of a material having a higher melting point than the drum casing 1 and the flange 2.

Figure 1:
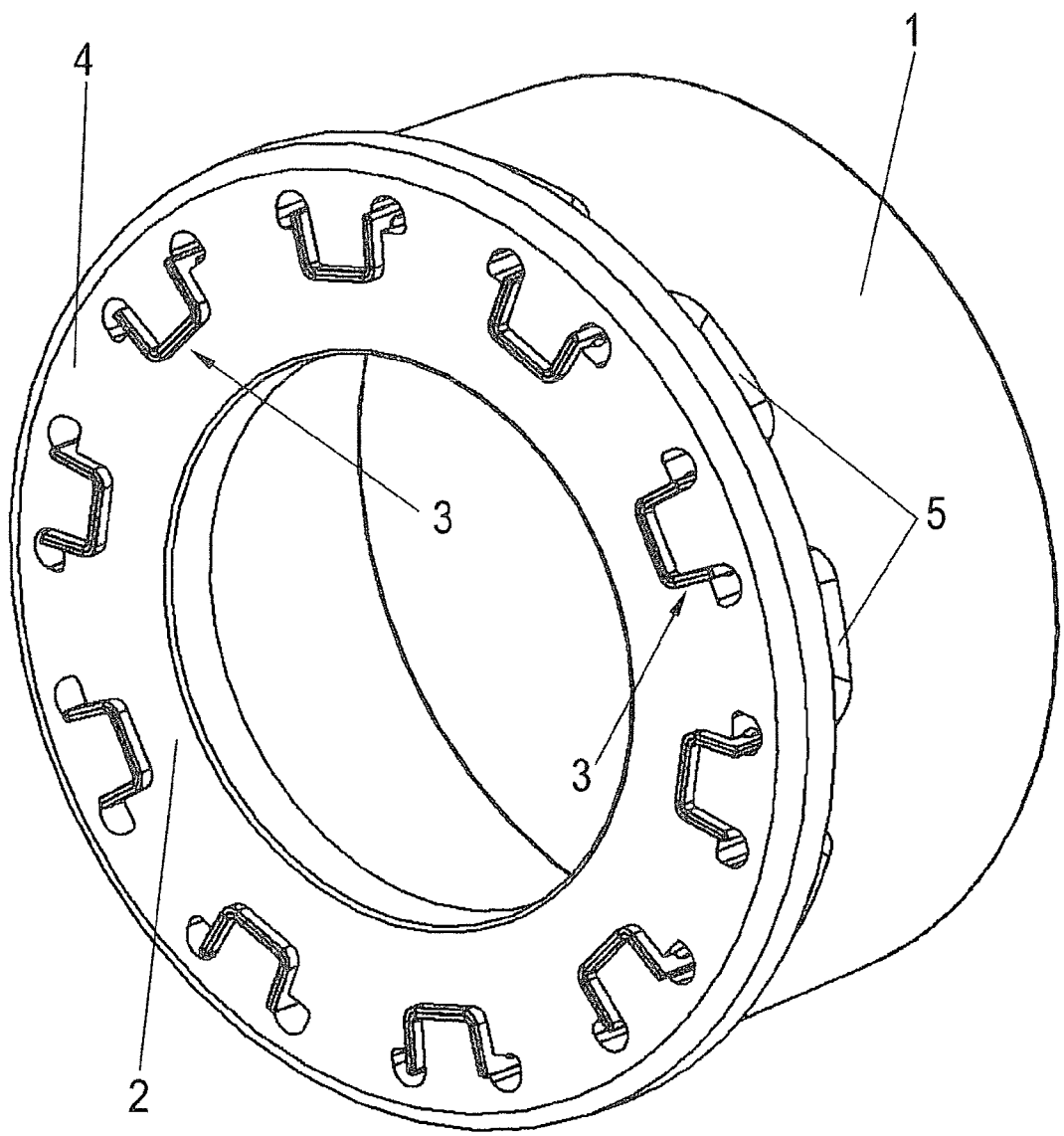
FIGS. 1-3 each show a brake drum implemented as a casting as a blank before final machining, in different views.
Figure 2:
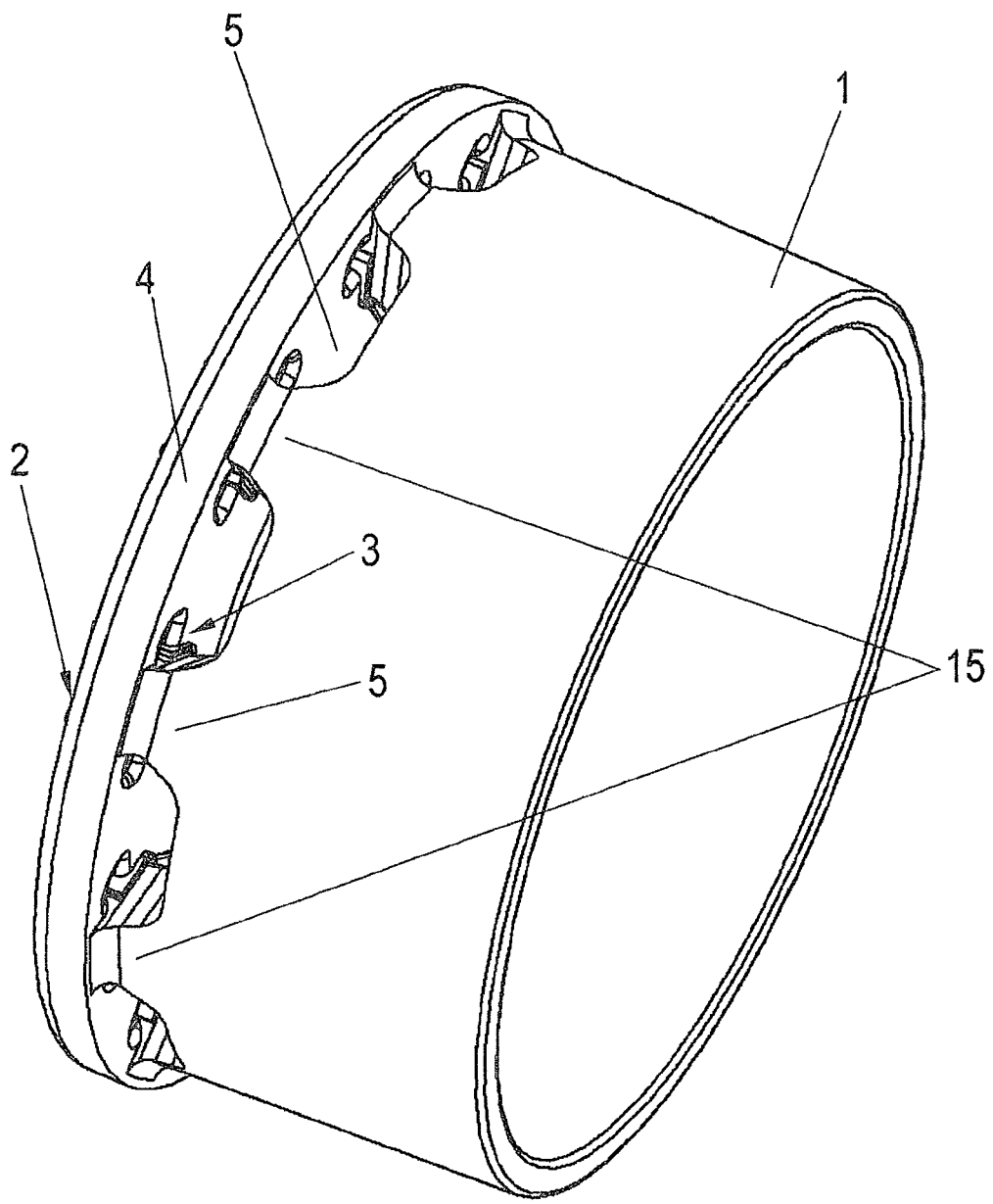
Figure 3:
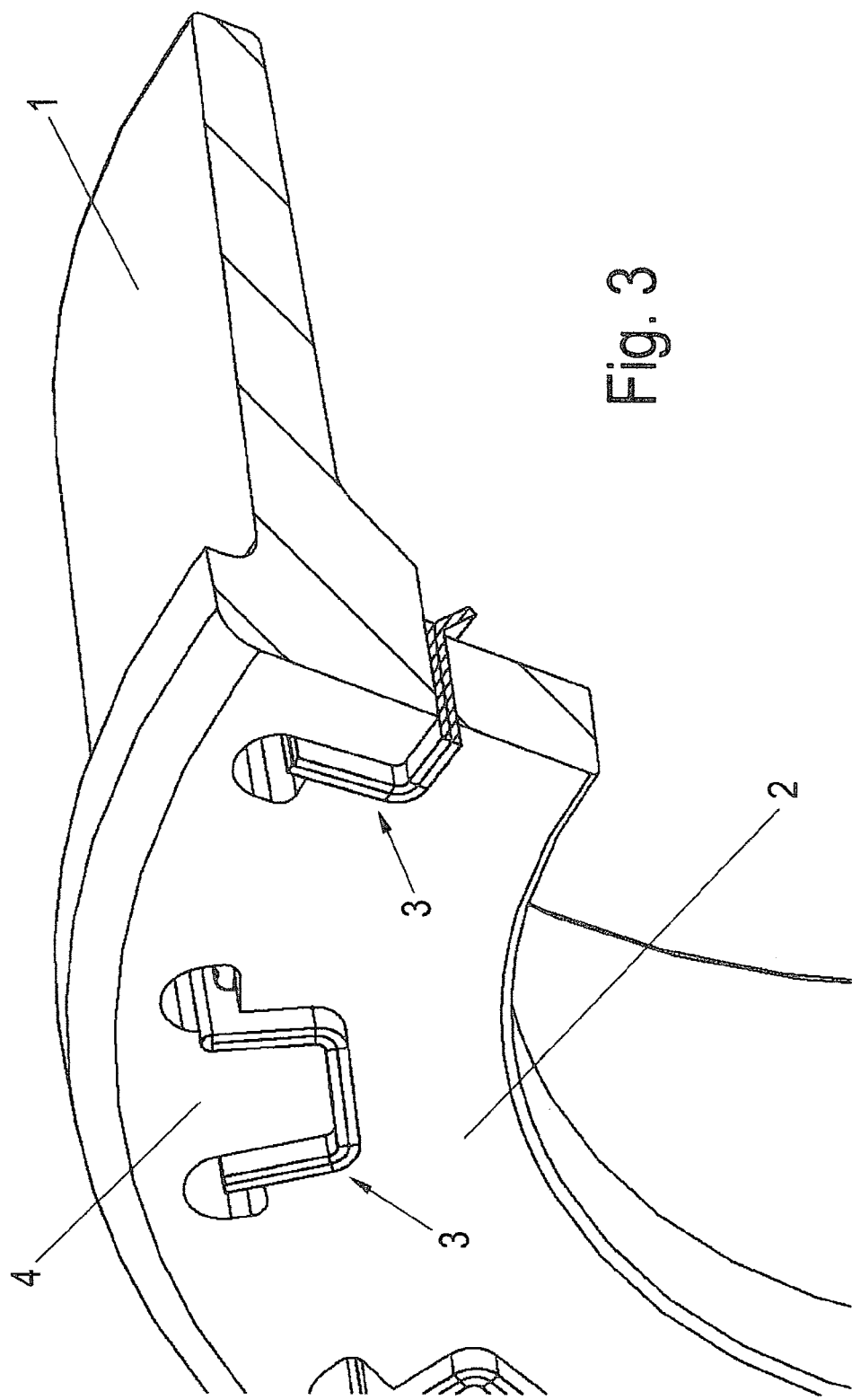

FIGS. 1 to 3 show the already cast, but not yet finished brake drum, in the case of which the flange 2 has a concentric, radially outwardly oriented cast-on rim 4, which is connected via connection webs 15 to the rotationally symmetrical drum casing 1.

To produce the brake drum, the sliding elements 3, which are arranged circumferentially with the same angular distance and are formed, for example, as shaped sheet metal parts with two plies, are each partially incorporated in an additional core, and the drum casing 1 and the flange 2 are cast as a one-piece component.

The brake drum is usually cast vertically, i.e. with the flange 2 at the bottom, the liquid iron firstly filling the flange region and then rising upward uniformly into the cylindrical region. The region of the drum casing 1 is filled through an overflow region which forms the rim 4 in the outer region of the flange 2.

Figure 4:
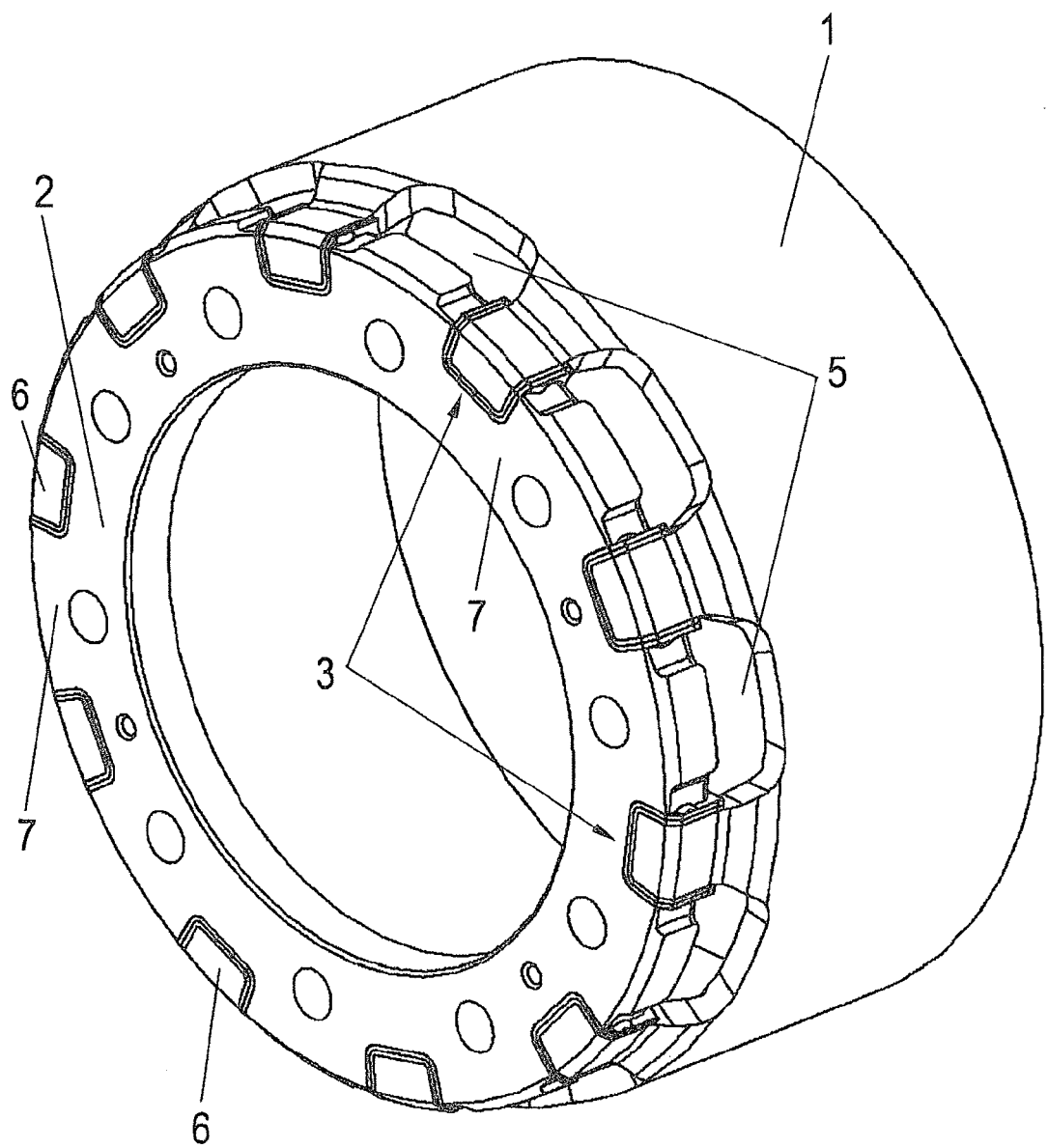
FIGS. 4 and 5 show the finished brake drum each in a perspective view.
Figure 5:
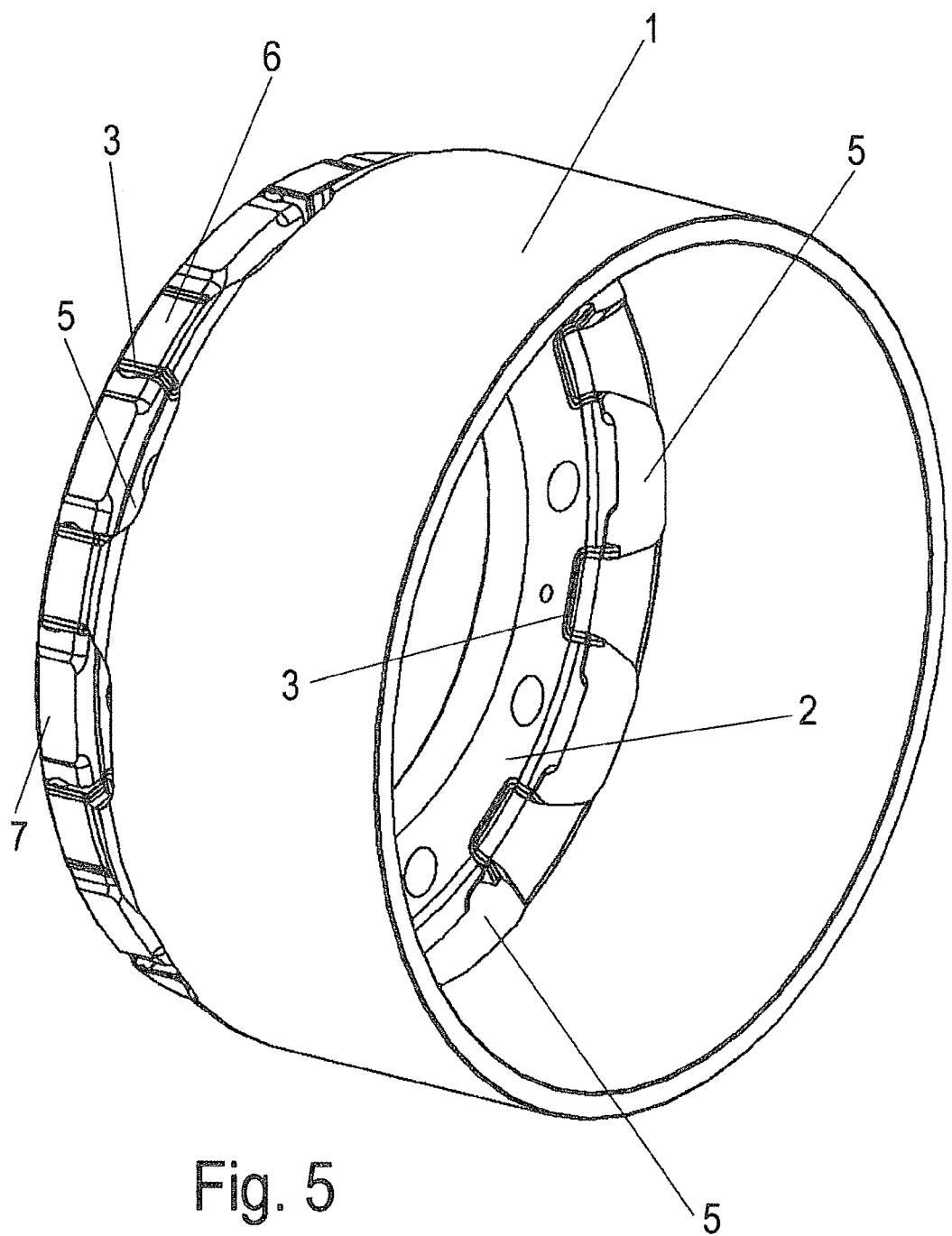

FIGS. 4 to 6 show the finished brake drum, in the case of which the rim 4 has been removed completely by chip-forming machining, such that the embodiment shown in these figures is obtained.

Teeth 6 integrally formed on the drum casing 1 are produced as a result of the embedded sliding elements 3. These teeth form a toothed ring which engages into a toothed ring of the flange 2 having teeth 7.

The sliding elements 3 are arranged between the radial side faces of the teeth 6, 7 which face toward one another, as well as in the base of a respective tooth space between the teeth 7 of the flange 2.

Figure 7A:
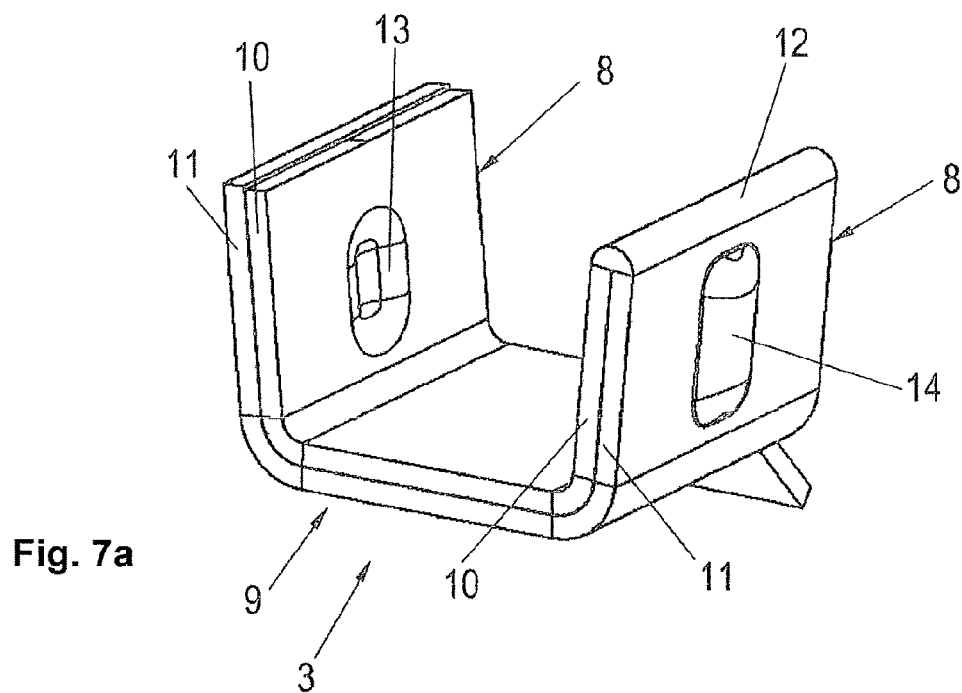
FIG. 7 shows a detail of the brake drum in two different views.
Figure 7B:
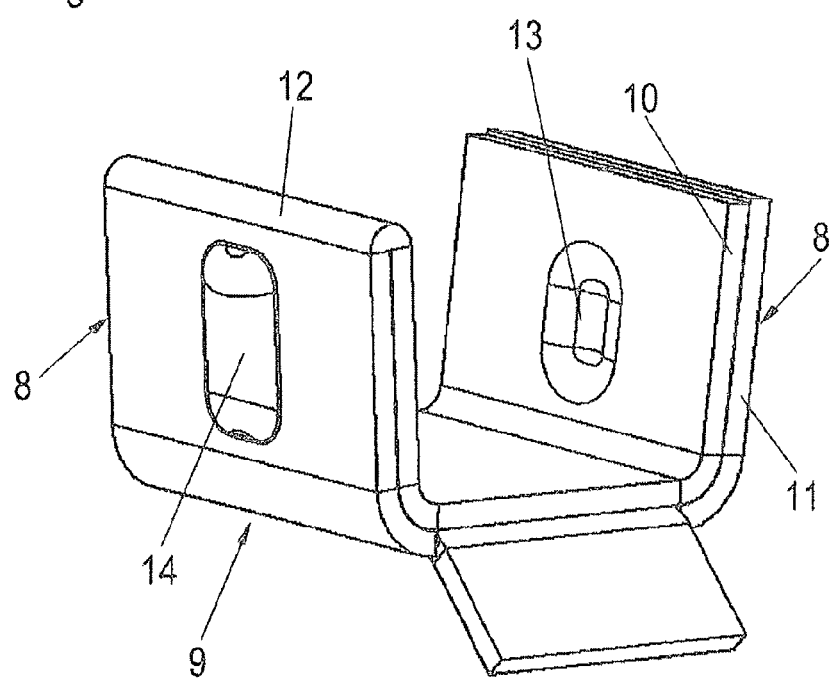

A sliding element 3 of this type is shown in detail in FIGS. 7a and 7b. It can be seen in FIGS. 7a and 7b that the sliding element 3, as mentioned, is in the form of a U-shaped shaped sheet metal part with two plies, with an inner ply 10 and an outer ply 11, which lie largely areally against one another and in each case form legs 8 which are oriented substantially in parallel and are connected to one another by a web 9 likewise having two plies, which rests on the base of the tooth space.

FIGS. 7a and 7b show the sliding element 3 as a blank, in the form in which it is inserted into the casting mold. It can be seen that here a bending edge 12 connects the inner and outer plies 10, 11 of one leg 8 to one another and, like the rim 4, is likewise removed by chip-forming machining during the machining which follows casting, and therefore during operation the inner and outer plies 10, 11 are displaceable radially with respect to one another.

For securing the drum casing 1 axially with respect to the flange 2, the two inner plies 10 each have outwardly turned protrusions 13 which engage into radially oriented beads 14 of the outer plies 11, and thereby form a radial guide, where the embossed formation created by the beads 14 forms a positive connection with the flange 2 in the direction of the tooth 7, while the impression of the protrusion 13 forms such a positive connection with the tooth 6 of the drum casing 1.

In FIG. 6, in particular, it can clearly be seen that the web 9, just like the legs 8, separates the tooth 6 of the drum casing 1 from the adjacent teeth 7 of the flange 2, such that there is no material connection between the flange 2 and the drum casing 1.

To optimize the dissipation of frictional heat during braking, the teeth 6, which for the rest run flush with the teeth 7 and the sliding elements 3 on the front side, are formed beyond the thickness of the teeth 7 of the flange 2 in the axial direction, such as to produce a cooling opening 5 in the region of overlap with the respective tooth 7.

LIST OF REFERENCE NUMERALS

1 Drum casing
2 Flange
3 Sliding element
4 Rim
5 Cooling opening
6 Tooth
7 Tooth
8 Leg
9 Web
10 Inner ply
11 Outer ply
12 Bending edge
13 Protrusion 14 Bead
15 Connection web The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cast brake drum, comprising:
a cylindrical drum casing;
a connected flange fastenable to a wheel hub;
cast-in sliding elements operatively arranged to materially separate the drum casing and the connected flange from one another, the cast-in sliding elements allowing for the drum casing to move radially relative to the connected flange,
wherein
the drum casing and the flange each have teeth forming a respective toothed ring, the toothed ring of the drum casing and the toothed ring of the flange engaging with one another; and
the sliding elements comprise a material having a melting point higher than a material of the drum casing and the flange and are arranged between radial side faces of the teeth which face toward one another.

2. The brake drum according to claim 1, wherein the sliding elements are shaped sheet metal parts.

3. The brake drum according to claim 1, wherein the sliding elements have a U-shape.

4. The brake drum according to claim 3, wherein each sliding element has two plies, one ply being an inner ply and the other ply being an outer ply.

5. The brake drum according to claim 4, wherein the inner ply and the outer ply of respectively opposing legs have a positive locking mechanism for securing against axial displacement; and
wherein the inner plies and the outer plies are movable radially with respect to one another.

6. The brake drum according to claim 2, wherein the sliding element has only one ply and is held positively on one of the teeth on one side.

7. The brake drum according to claim 6, wherein the one ply is provided with a release coating on a contact surface lying opposite the positively held side.

8. The brake drum according to claim 4, wherein the sliding elements are positively connected with the inner ply and the outer ply to respectively abutting teeth.

9. The brake drum according to claim 1, wherein each sliding element encompasses an associated tooth of the drum casing.

10. The brake drum according to claim 3, wherein a web of the U-shaped sliding element is arranged on a base of a tooth space formed between two teeth of the flange, the web connecting legs of the U-shaped sliding element.

11. The brake drum according to claim 1, wherein the sliding elements comprise a metallic material.

12. The brake drum according to claim 11, wherein the sliding elements are made of stainless steel.

13. The brake drum according to claim 1, wherein the sliding elements, the drum casing teeth and the flange teeth are formed flush on a front side of the brake drum.

14. The brake drum according to claim 13, wherein the drum casing comprises apertures located in regions of overlap with respective flange teeth, the apertures forming cooling openings.

15. The brake drum according to claim 1, wherein the drum casing and the flange are integrally connected to one another before being finally machined into the brake drum.

* * * * *